(12) United States Patent
Palayur

(10) Patent No.: US 10,177,815 B2
(45) Date of Patent: Jan. 8, 2019

(54) POWERING MULTIMEDIA OVER COAX ALLIANCE (MOCA) DEVICES AND CABLE MODEMS

(71) Applicant: MaxLinear, Inc., Carlsbad, CA (US)

(72) Inventor: Saju Palayur, Carlsbad, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 12 days.

(21) Appl. No.: 15/380,207

(22) Filed: Dec. 15, 2016

(65) Prior Publication Data

US 2017/0170873 A1    Jun. 15, 2017

Related U.S. Application Data

(60) Provisional application No. 62/267,412, filed on Dec. 15, 2015.

(51) Int. Cl.
*H04B 3/00* (2006.01)
*H04B 3/54* (2006.01)
*H04L 12/28* (2006.01)

(52) U.S. Cl.
CPC .......... *H04B 3/548* (2013.01); *H04L 12/2801* (2013.01)

(58) Field of Classification Search
CPC .............................. H04B 3/548; H04L 12/2801
USPC ....................................................... 375/257
See application file for complete search history.

(56) References Cited

U.S. PATENT DOCUMENTS

| | | | | |
|---|---|---|---|---|
| 8,761,350 B2 * | 6/2014 | Faulkner | ................ | H04L 43/50 379/1.04 |
| 8,931,032 B2 * | 1/2015 | Egan | ..................... | H04N 7/106 361/809 |
| 9,112,717 B2 * | 8/2015 | Klein | ...................... | H04L 12/12 |
| 2009/0010263 A1 * | 1/2009 | Ma | ..................... | H04L 12/2801 370/395.4 |
| 2009/0016349 A1 * | 1/2009 | Cha | ....................... | H04N 7/1675 370/392 |
| 2010/0031297 A1 * | 2/2010 | Klein | ..................... | H04L 12/12 725/78 |
| 2010/0146564 A1 * | 6/2010 | Halik | .................. | H04L 12/2801 725/78 |
| 2011/0001833 A1 * | 1/2011 | Grinkemeyer | ......... | H04H 20/12 348/192 |

(Continued)

*Primary Examiner* — Helene Tayong
(74) *Attorney, Agent, or Firm* — McAndrews, Held & Malloy, Ltd.

(57) ABSTRACT

Systems and methods are provided for powering Multimedia over Coax Alliance (MoCA) devices. An electronic device that is configured for use in a multimedia over coax alliance (MoCA) network may include a communication circuit operable to communicate multimedia over coax alliance (MoCA) based signals over coax cabling in the MoCA network, and one or more power circuits operable to support supplying and/or drawing power over the coax cabling in the MoCA network, to enable powering the electronic device and/or one or more other electronic devices in the MoCA network. The power circuits may include one or more of: a power regulator circuit that draws power from the coax cabling and/or regulates use of the power, a power source circuit that supplies power into the coax cabling, and a power management circuit that manages power related operations in the electronic device and/or in the MoCA network.

18 Claims, 4 Drawing Sheets

(56) References Cited

U.S. PATENT DOCUMENTS

| | | | |
|---|---|---|---|
| 2011/0085089 A1* | 4/2011 | Jung | H04L 12/12 |
| | | | 348/734 |
| 2011/0222549 A1* | 9/2011 | Connelly | G06F 8/65 |
| | | | 370/401 |
| 2015/0026750 A1* | 1/2015 | Wachob | H04N 7/22 |
| | | | 725/127 |
| 2015/0046609 A1* | 2/2015 | Gallagher | G06F 1/3234 |
| | | | 710/52 |
| 2015/0207525 A1* | 7/2015 | Li | H04N 21/6118 |
| | | | 370/297 |
| 2017/0133935 A1* | 5/2017 | Balteanu | H02M 3/158 |

* cited by examiner

POWERING MULTIMEDIA OVER COAX ALLIANCE (MOCA) DEVICES AND CABLE MODEMS

CLAIM OF PRIORITY

This patent application makes reference to, claims priority to and claims benefit from U.S. Provisional Patent Application Ser. No. 62/267,412, filed Dec. 15, 2015. The above identified application is hereby incorporated herein by reference in its entirety.

TECHNICAL FIELD

Aspects of the present disclosure relate to network solutions. More specifically, certain implementations of the present disclosure relate to methods and systems for powering Multimedia over Coax Alliance (MoCA) devices or cable modems

BACKGROUND

Various issues may exist with conventional approaches for powering Multimedia over Coax Alliance (MoCA) devices. In this regard, conventional systems and methods, if any existed, for powering MoCA devices can be costly, cumbersome, and/or inefficient.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for a powered Multimedia over Coax Alliance (MoCA) devices, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE INVENTION

As utilized herein the terms "circuits" and "circuitry" refer to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g.," set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Figure 1:
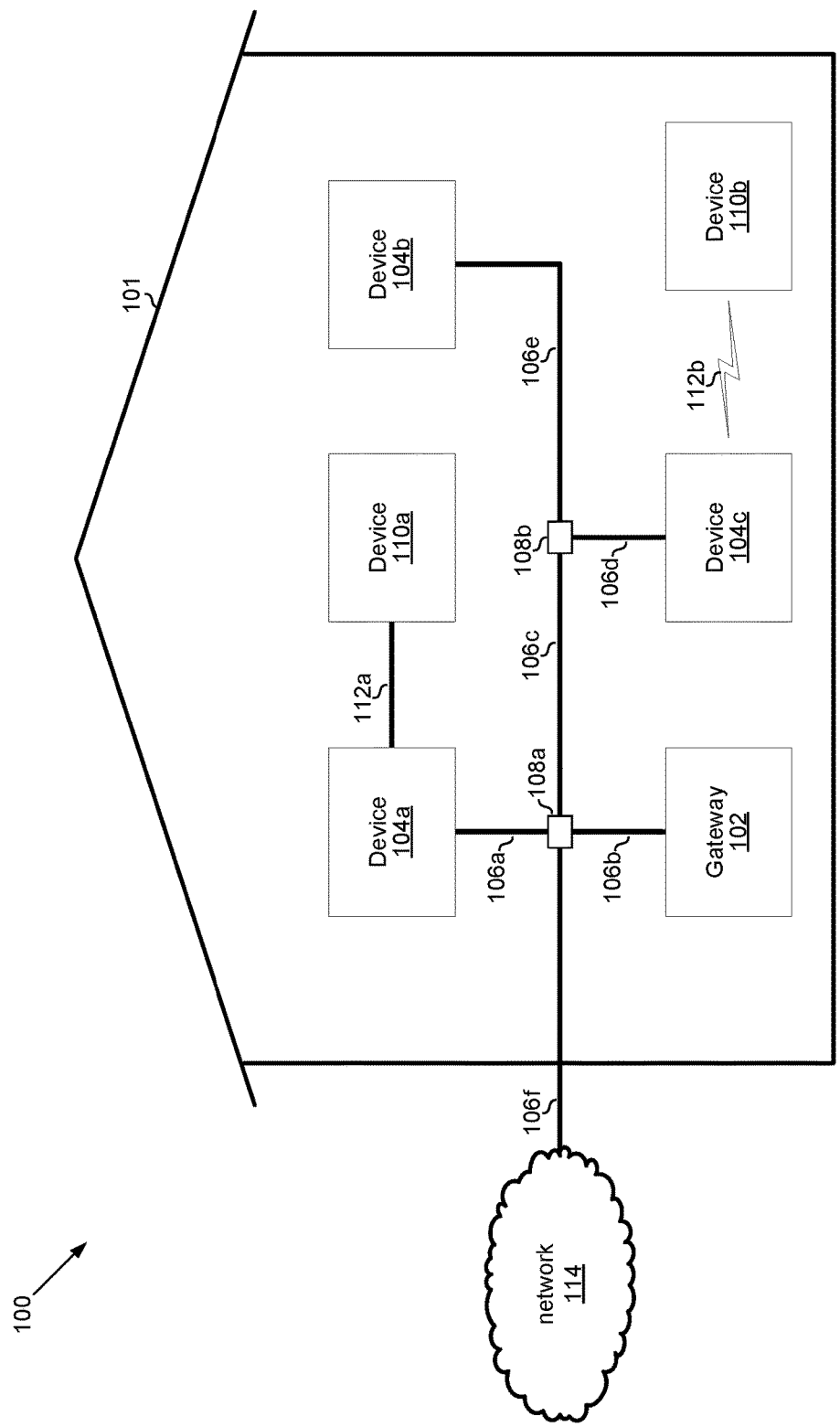
FIG. 1 illustrates an example in-home Multimedia over Coax Alliance (MoCA) network.

FIG. 1 illustrates an example in-home Multimedia over Coax Alliance (MoCA) network. Shown in FIG. 1 is a MoCA-based home network 100, connected to an external network 114.

The home network 100 comprises a plurality of devices connected within a premises 101 (e.g., home, multi-unit residence, etc.). The home network 100 may comprise, for example, a gateway device 102 and one or more networks (e.g., network devices 104a-104c and 110a-110b, as shown in the example implementation depicted in FIG. 1). The gateway device 102 and the network devices 104a-104c may be coupled via links 106a-106d and splitters 108a-108b, and the network devices 110a-110b may be coupled to the network devices 104a and 104c via links 112a and 112b, respectively.

Each of the links 106a-106f may comprise wired cabling, optical cabling, and/or wireless links. In an example implementation, each of the links 106a-106f may comprise coaxial cabling. The splitter 108a may be operable to electrically couple links 106a, 106b, 106c, and 106f such that the signal on each of these four links is substantially the same. The splitter 108b may be operable to electrically couple links 106c, 106d, and 106e such that the signal on each of these three links is substantially the same.

Each of the gateway device 102 and the network devices $104_i$ and $110_i$ may comprise suitable circuitry for implementing various aspects of the present disclosure. In this regard, each of the gateway device 102 and the network devices $104_i$ and $110_i$ may comprise suitable circuitry for facilitating connectivity and/or communication within the home network 100.

For example, the gateway device 102 may comprise suitable circuitry operable to communicate over the links 106a-106f. The circuitry of the gateway device 102 may also be operable to communicate with network 114 (e.g., a CATV network, a DSL network, a satellite network, etc.). The gateway device 102 may be, for example, a set-top box or gateway operable to receive data from the network 114 via the links 106f and 106b, process the received data, and convey the processed data to the network devices 104a-104c via the links 106a-106e. In an example implementation, the gateway device 102 may communicate the processed data over the links 106b-106e in accordance with Multimedia over Coax Alliance (MoCA) standards. In such an implementation, the gateway device 102 may function as the network coordinator of the MoCA network.

Each of the network devices 104a-104c may comprise suitable circuitry operable to communicate over the links 106a-106e. The network device 104c may be, for example, a wireless access point operable to convert between the network protocols (e.g., MoCA) utilized on the links 106b-106e and the network protocols (e.g., IEEE 802.11) utilized on the link 112b. The network device 104a may be, for example, a network adaptor operable to convert between the network protocols (e.g., MoCA) utilized on the links 106b-106e and the network protocols (e.g., HDMI or USB) utilized on the link 112a.

Each of the network devices 110a and 110b may comprise suitable circuitry operable to receive media and/or data via the links 112a and 112b, respectively. Each of the network devices 110a and 110b may be, for example, an end-point such as a television or personal computer.

In operation, the home network 100 may be configured to support MoCA based connectivity and/or communications. In this regard, various devices in the home network 100 may utilize MoCA based communications (using RF signaling) over coax cabling 106 to exchange data.

Conventionally, the devices in the home network 100 are powered independently—e.g., using local power sources, power adapters, etc. Such approach has certain drawbacks, however, as it may result in, for example, added complexity, inflexible installation, and/or added cost. Accordingly, performance and/or utility may be improved by incorporating salutation for obviating the need for using dedicated power adapters and/or supply connections. For example, in MoCA based arrangement, devices may be powered using power routed over the same coax cabling that is used for the RF signaling corresponding to the MoCA communications. Such approach is described in more detail with respect to the example implementation illustrated in FIG. 2.

Figure 2:
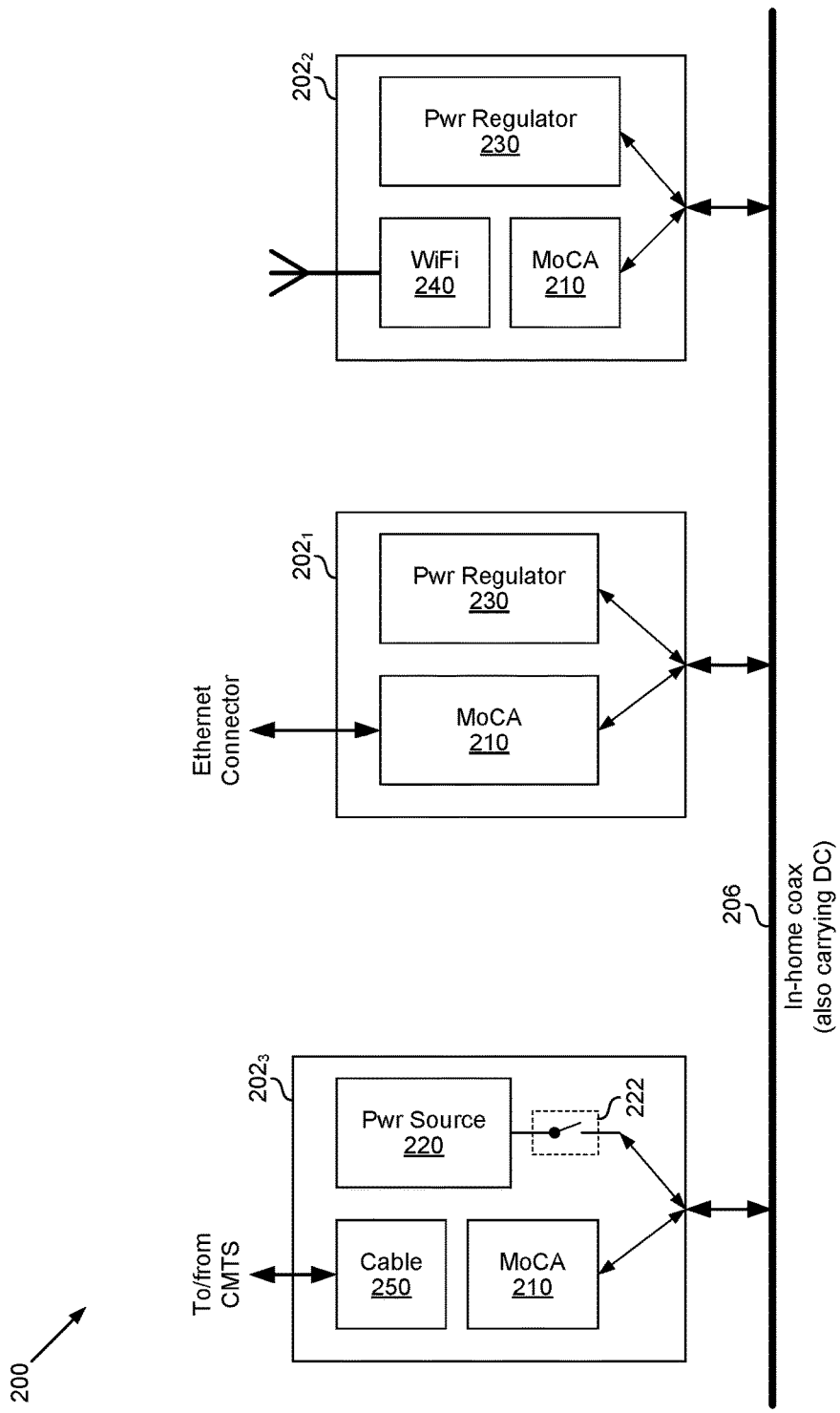
FIG. 2 illustrates an example arrangement of Multimedia over Coax Alliance (MoCA) devices supporting powering via coax cabling, in accordance with an example implementation.

FIG. 2 illustrates an example arrangement of Multimedia over Coax Alliance (MoCA) devices supporting powering via coax cabling, in accordance with an example implementation. Shown in FIG. 2 is a MoCA-based arrangement 200.

The MoCA-based arrangement 200 may comprise a plurality of network devices $202_i$ that support Multimedia over Coax Alliance (MoCA) based connectivity and/or communication (referred to hereafter as "MoCA devices"). Each of the MoCA device $202_i$ may perform or support particular functions and/or operations within the MoCA based MoCA-based arrangement 200. In the example implementation depicted in FIG. 2, the MoCA device $202_3$ may function as a gateway (e.g., cable modem), with MoCA devices $202_1$ and $202_2$ being configured as client devices serviced by the MoCA device $202_1$. For example, the MoCA device $202_3$ may be similar to the gateway device 102, and the devices $202_1$-$202_2$ may be similar to the network devices 104a-104c and 110a-110b of FIG. 1.

The MoCA devices $202_1$-$202_3$ may be connected via coax cabling 206, and may be configured to communicate over the coax cabling 206 in accordance with MoCA standards. In this regard, the (gateway) MoCA device $202_3$ may function as the network coordinator of the MoCA network. To enable MoCA based communications, each of the (gateway) MoCA device $202_3$ and the (client) MoCA devices $202_1$ and $202_2$ may comprise a MoCA block 210. In this regard, each MoCA block 210 may comprise suitable circuitry for providing interfacing and/or related processing in support of MoCA based communications such as over coax cabling 206.

Further, each the MoCA devices $202_i$ may also comprise suitable circuitry for supporting and/or enabling provision of additional services, functions, and/or operations (including MoCA and non-MoCA related services). For example, the (gateway) MoCA device $202_3$ may comprise suitable circuitry for supporting and/or enabling performing "gateway" functions. In this regard, the (gateway) MoCA device $202_3$ may be operable to communicate, on one end, with external sources or networks (e.g., a CATV network, a DSL network, a satellite network, etc.), and with one or more client devices (e.g., the MoCA devices $202_1$ and $202_2$) on the other end, to enable providing services (e.g., broadband access, content distribution, etc.) to the client devices and/or other devices (not shown) connected through the client devices. In this regard, the (gateway) MoCA device $202_3$ may be operable to receive data, process the received data, and convey the processed data to the client devices.

For example, in cable based implementations, the (gateway) MoCA device $202_3$ may function as a cable modem and/or support cable modem operations. In this regard, (gateway) MoCA device $202_3$ may comprise a cable block 250, which may comprise suitable circuitry for providing interfacing and/or related processing in support of cable based communication, such as to connect to a cable modem termination system (CMTS) in the cable network.

The (client) MoCA device $202_1$ may comprise suitable circuitry for supporting and/or enabling functioning as a MoCA adapter, to provide MoCA-based (that is via MoCA based backbone) Ethernet connectivity to one or more other devices (not shown) in a home network. Thus, the (client) MoCA device $202_1$ may support Ethernet related interfacing and/or processing (e.g., via the MoCA block 210 and/or other additional circuitry).

Similarly, the (client) MoCA device $202_2$ may comprise suitable circuitry for supporting and/or enabling functioning as a wireless (e.g., WiFi) extender, to provide MoCA-based (that is via a MoCA based backbone) wireless connectivity to one or more other devices (not shown) in a home network. Thus, the (client) MoCA device $202_2$ may comprise a WiFi block 240, which comprise suitable circuitry (and, optionally, additional hardware required for its operation—e.g., antennas) for handling WiFi based communications (performing, e.g., processing required for transmission and/or reception of signals over WiFi interface/links).

In various embodiments in accordance with the present disclosure, the MoCA-based arrangement 200 may be implemented and/or configured to support powered MoCA devices. In this regard, conventionally, MoCA devices (particularly client MoCA devices) are powered using external/dedicated sources/connections—e.g., drawing power through local power adapters. Such approach has certain drawbacks, however. The use of such power adapters may complicate the placement and/or installation of MoCA devices, and/or may add cost (e.g., the power adapters, any additional hardware required to facilitate use and/or support of such power adapters, etc.).

Accordingly, performance may be improved by using powered MoCA devices instead—that is, MoCA devices which do not require dedicated power adapters and/or supply connections. For example, MoCA devices may be powered over the same coax cabling that is used for the RF signaling corresponding to the MoCA communications. In this regard, the MoCA devices may incorporate circuitry for supporting supplying power over coax cabling, such as to enable routing power internally within the home network, to power devices hanging off of the coax cabling.

For example, in the implementation depicted in FIG. 2, the (gateway) MoCA device $302_3$ may comprise a power source 220, which may be configured to supply power (e.g., such as by applying direct current (DC) voltage, for example 12V, or by applying low frequency alternating current (AC) voltage) into the coax cabling 206. The application of power may be selective, such as by use of switch 222 to turn on/off the supplying of power into the coax cabling 206. Each of the (client) MoCA devices $202_1$ and $202_2$ may comprise a power regulator 230, which may be operable to draw power (e.g., DC power) from the coax cabling 206, and/or to regulate use of the drawn power within the (client) MoCA devices $202_1$ and $202_2$ (e.g., to power various components of the devices).

Figure 3:
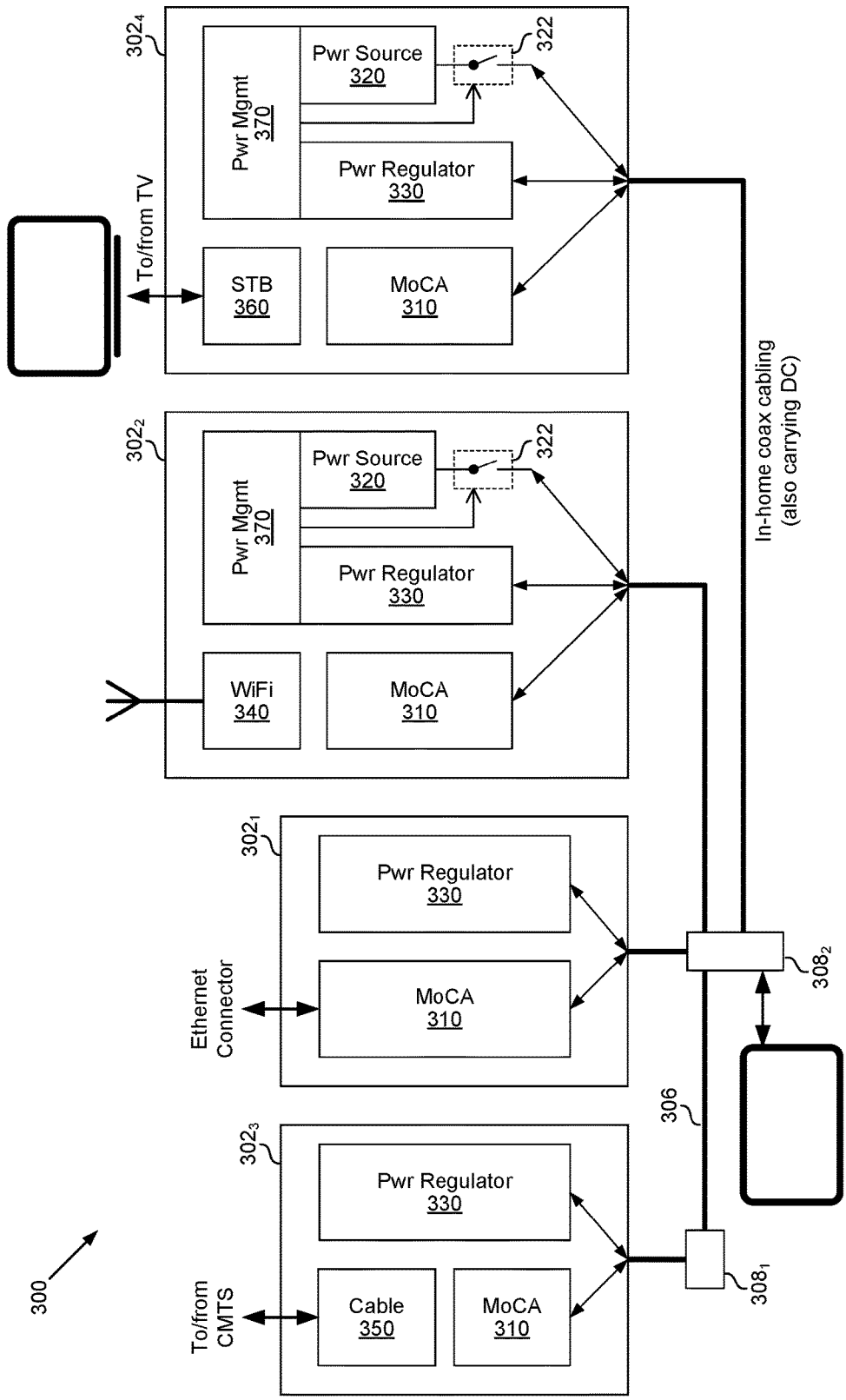
FIG. 3 illustrates another example arrangement of Multimedia over Coax Alliance (MoCA) devices supporting powering via coax cabling, in accordance with an example implementation.

FIG. 3 illustrates another example arrangement of Multimedia over Coax Alliance (MoCA) devices supporting powering via coax cabling, in accordance with an example implementation. Shown in FIG. 3 is a MoCA-based arrangement 300.

The MoCA-based arrangement 300 may be substantially similar to the MoCA-based arrangement 200 of FIG. 2, for example. In this regard, the MoCA-based arrangement 300 may similarly comprise a plurality of MoCA devices $302_i$ (e.g., MoCA devices $302_1$-$302_4$ in the particular implementation depicted in FIG. 3) that support MoCA based connectivity and/or communication. The MoCA devices $302_1$-$302_4$ may be connected via coax cabling 306 and one or more splitters 308 (e.g., splitters $308_1$ and $308_2$ in the particular implementation depicted in FIG. 3), each of which substantially similar to the splitters 108; of FIG. 1, for example. Each of the MoCA devices $302_i$ may be operable to communicate over the coax cabling 306 (and the splitters $308_j$), in accordance with MoCA standards. In this regard, each of the MoCA devices $302_i$ may comprise a MoCA block 310, which may be substantially similar to the MoCA block 210 of FIG. 2, for example.

Further, each of the MoCA devices $302_i$ may be configured to provide particular services, functions, and/or operations within the MoCA based MoCA-based arrangement 300, and may comprise suitable circuitry for performing or supporting these services, functions, and/or operations. In the example implementation depicted in FIG. 3, the MoCA device $302_3$ may function as a gateway (e.g., cable modem), the MoCA device $302_1$ may function as a MoCA adapter, the MoCA device $302_2$ may function as a wireless (e.g., WiFi) extender, and the MoCA device $302_4$ may function as set-top box (STB).

In this regard, the MoCA device $302_1$ may comprise, for example, suitable circuitry for providing Ethernet related interfacing and/or processing (e.g., via the MoCA block 310 and/or other additional circuitry), as described with respect to the MoCA device $202_1$ of FIG. 2. The MoCA device $302_2$ may comprise a WiFi block 340, which may be substantially similar to the WiFi block 240 of FIG. 2, for example. The MoCA device $302_3$ may comprise a cable block 350, which may be substantially similar to the cable block 250 of FIG. 2, for example. The MoCA device $302_4$ may comprise a STB block 360, which comprise suitable circuitry (and additional hardware—e.g., antennas) for providing interfacing and/or related processing in support of STB based functions and/or operations.

The MoCA-based arrangement 300 may be implemented and/or configured to support powered MoCA devices, substantially as described with respect to FIG. 2, for example. In this regard, the MoCA devices $302_i$ may incorporate circuitry for supporting supplying power over coax cabling, such as to enable routing power internally within the home network, to power devices hanging off of the coax cabling, as described with respect to FIG. 2. In the implementation depicted in FIG. 3, however, certain devices may be configured to selectively provide and/or receive power over the coax cabling.

For example, while each of the MoCA devices $302_1$ and $302_3$ may comprise only a power regulator 330 (and thus may only be operable to draw power from the coax cabling), each of the MoCA devices $302_2$ and $302_4$ may comprise both a power source 320 and a power regulator 330, to enable them to provide and/or draw power. In this regard, the power source 320 and the power regulator 330 may be substantially similar to the power source 220 and the power regulator 230 of FIG. 2, for example.

Further, to support adaptive management of power over coax cabling, one or more of the MoCA devices $302_i$ may comprise a power management block 370. In this regard, the power management block 370 may comprise suitable circuitry for managing power-related components and/or functions, within the MoCA device that incorporates the power management block 370 and/or in the MoCA arrangement (e.g., other MoCA devices, in splitters, etc.). For example, in the implementation shown in FIG. 3, each of the MoCA devices $302_2$ and $302_4$ may comprise an instant of the power management block 370. In this regard, the power management block 370 may monitor power supply and/or consumption within the device or through the MoCA arrangement. Based on that information, power functions may be controlled. For example, control signals may be generated to switch power supply on (or off), via switches 322. Also, the amount of power provided by the power source 320 may be modified (increased or decreased) based on the information.

In an example implementation, the MoCA devices $302_i$, particularly those incorporating power management blocks (e.g., instances of power management block 370) may coordinate with one another to collectively manage power operations in the MoCA arrangement 300. For example, the power management block(s) 370 may collect and/or generate power-related data (e.g., available supply, consumption requirements, etc.), which the MoCA devices $302_i$ may then exchange. Further, using the power management block(s) 370, the MoCA devices $302_i$ may negotiate, such as based on the exchanged power-related data, assignment of tasks (e.g., supplying vs. drawing power) and/or power-related parameters (e.g., permitted percentages of overall power supply and/or consumption, etc.) within the overall power management scheme. The power-related communications (e.g., exchange of data, negotiations, assignments, status updates, etc.) may be performed over the MoCA backbone in the home network comprising the MoCA-based arrangement 300.

Figure 4:
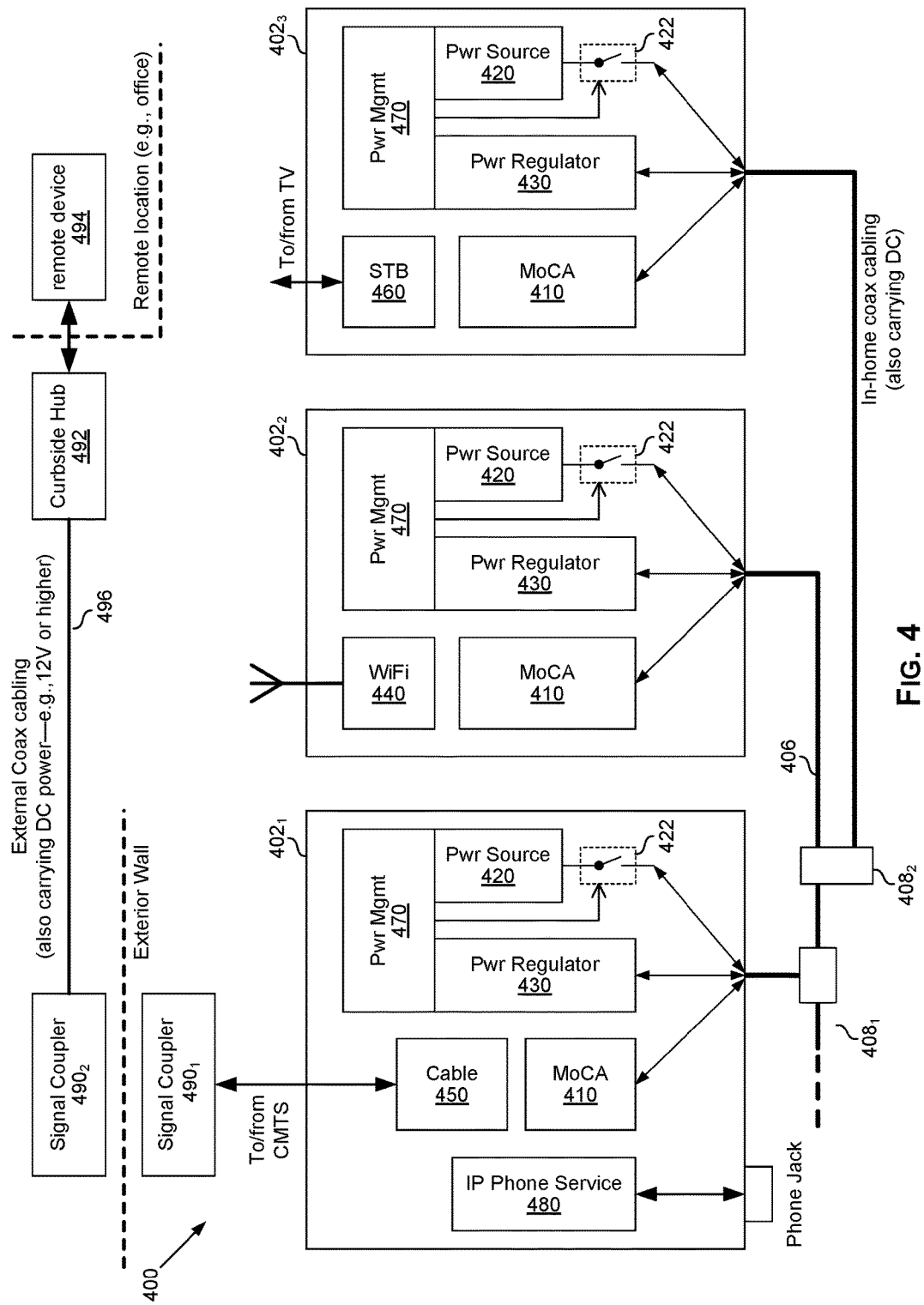
FIG. 4 illustrates another example arrangement of Multimedia over Coax Alliance (MoCA) devices supporting powering via coax cabling, including external coax cabling to provide and/or obtain power from remote systems, in accordance with an example implementation.

FIG. 4 illustrates another example arrangement of Multimedia over Coax Alliance (MoCA) devices supporting powering via coax cabling, including external coax cabling to provide and/or obtain power from remote systems, in accordance with an example implementation. Shown in FIG. 4 is a MoCA-based arrangement 400.

The MoCA-based arrangement 400 may be configured for supporting use of powered MoCA devices, substantially in a similar manner as the MoCA-based arrangements described above with respect FIGS. 2 and 3, for example. In this regard, the MoCA-based arrangement 400 may comprise a plurality of MoCA devices $402_i$ (of which MoCA devices $402_1$-$402_3$ are shown in the particular implementation depicted in FIG. 4) that support MoCA based connectivity and/or communications. The MoCA devices $402_1$-$402_3$ may be connected via coax cabling 406, as well as via one or more splitters 408 (e.g., splitters $408_1$ and $408_2$ depicted in FIG. 4), each of which may be substantially similar to the splitters $108_i$ of FIG. 1, for example. The MoCA devices $402_1$-$402_3$ may be substantially similar to the MoCA devices $202_1$-$202_3$ of FIG. 2 and the MoCA devices $302_1$-$302_4$ of FIG. 3, for example. In this regard, each of the MoCA devices $402_i$ may be operable to communicate over the coax cabling 406 (and the splitters $408_i$), in accordance with MoCA standards. In this regard, each of the MoCA devices $402_i$ may comprise a MoCA block 410, which may be substantially similar to the MoCA block 210 of FIG. 2, for example.

Each of the MoCA devices $402_i$ may be configured to provide one or more particular services, functions, and/or operations within the MoCA based MoCA-based arrangement 400, and may comprise suitable circuitry for performing or supporting these services, functions, and/or operations. In the particular implementation shown in FIG. 4, for example, the MoCA device $402_1$ may function as a gateway (e.g., cable modem), the MoCA device $402_2$ may function as a wireless (e.g., WiFi) extender, and the MoCA device $402_3$ may function as set-top box (STB).

Accordingly, the MoCA device $402_2$ may comprise a WiFi block 440, which may be substantially similar to the WiFi block 240 of FIG. 2, for example. The MoCA device $402_3$ may comprise a cable block 450, which may be substantially similar to the cable block 250 of FIG. 2, for example. The MoCA device $402_4$ may comprise a STB block 460, which comprise suitable circuitry (and additional hardware—e.g., antennas) for providing interfacing and/or related processing in support of STB based functions and/or operations.

As with the MoCA-based arrangements 200 and 300, the MoCA-based arrangement 400 may also be implemented and/or configured to support powered MoCA devices, substantially as described with respect to FIGS. 2 and 3, for example. In this regard, the MoCA devices $402_i$ may incorporate circuitry for supporting supplying power over coax cabling, such as to enable routing power internally within the home network, to power devices hanging off of the coax cabling, as described with respect to FIGS. 2 and 3, for example. Further, as with the MoCA-based arrangement 300, at least some of the MoCA devices in the MoCA-based arrangement 300 may also be configured to selectively provide and/or receive power over the coax cabling.

For example, as shown in FIG. 4, each of the MoCA devices $402_1$-$402_3$ may comprise a power regulator 430 (which is substantially similar to each of the power regulator 230 of FIG. 2 and the power regulator 330 of FIG. 3) for use in drawing power from the coax cabling), a power source 420 (which is substantially similar to each of the supply 220 of FIG. 2 and the supply 320 of FIG. 3) for use in providing power. Further, to support adaptive management of power over coax cabling, one or more of the MoCA devices $402_i$ may comprise a power management block 470, which is substantially similar to each of the power management block 370 of FIG. 3, for example. In this regard, the power management block 470 may comprise suitable circuitry for managing power-related components and/or functions, within the MoCA device that incorporates the power management block 470 and/or in the MoCA arrangement (e.g., other MoCA devices, in splitters, etc.) comprising that MoCA device.

In the implementation shown in FIG. 4, each of the MoCA devices $402_2$ and $402_4$ may comprise an instant of the power management block 470. In this regard, the power management block 470 may monitor power supply and/or consumption within the device or through the MoCA arrangement. Based on that information, power functions may be controlled. For example, control signals may be generated to switch power supply on (or off), via switches 422. Also, the amount of power provided by the power source 420 may be modified (increased or decreased) based on the information.

In an example implementation, the MoCA devices $402_i$, particularly those incorporating power management blocks (e.g., instances of power management block 470) may coordinate with one another to collectively manage power operations in the MoCA arrangement 400, substantially as described above with respect to the MoCA-based arrangement 300 of FIG. 3, for example. In this regard, the MoCA devices $402_i$, using their power management blocks 470, may exchange power-related data, and may negotiate, based on the exchanged power-related data, assignment of power-related tasks and/or power-related parameters (e.g., permitted percentages of overall power supply and/or consumption, etc.) within the overall power management scheme. The power-related communications (e.g., exchange of data, negotiations, assignments, status updates, etc.) may be performed over the MoCA backbone in the home network comprising the MoCA-based arrangement 400.

However, the MoCA-based arrangement 400 may also be configured to support supplying power to or drawing power from external and remote systems—that is, systems residing outside the premises housing the MoCA-based arrangement 400. For example, the MoCA-based arrangement 400 may supply or draw power to and/or draw power from external devices that are connected and/or have access to external coax cabling 496 bringing cable signals into the MoCA-based arrangement 400.

As shown in the example implementation shown in FIG. 4, the MoCA-based arrangement 400 may connect to the external coax cabling 496 via the cable block 450 and a pair of signal couplers $490_1$ and $490_2$ (with the signal coupler $490_1$ on the inside of the premises' exterior wall and the signal coupler $490_2$ on the outside of the exterior wall, opposite and across from the signal coupler $490_1$). A remote device 494 (e.g., in an office) may, if necessary, provide power to or draw power from the MoCA-based arrangement 400 via the coax cabling 496 (through a curbside hub 492, for example).

For example, the remote device 494 may draw power from the MoCA-based arrangement 400 in case of power outages affecting the office (but not the premises housing the MoCA-based arrangement 400). In an example use scenario, the MoCA device $402_1$ may be built without a local power source (e.g., local battery) for an Internet protocol (IP) phone service block 480, which comprises suitable circuitry for providing IP phone services within the premises housing the MoCA-based arrangement 400. The MoCA device $402_1$ may instead be powered using from another sources, including an external power source (e.g., the remote device 494).

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
an electronic device configured for use in a multimedia over coax alliance (MoCA) network, said electronic device comprises:
a communication circuit operable to communicate multimedia over coax alliance (MoCA) based signals over coax cabling in said MoCA network; and
one or more power circuits operable to support one or both of supplying and drawing power over said coax cabling in said MoCA network, to enable powering of one or more of said electronic device and one or more other electronic devices in said MoCA network;
wherein:
said one or more power circuits comprise a power management circuit that is operable to manage power related operations in one or both of said electronic device and said MoCA network; and
said power management circuit is operable to trigger or handle one or more control signals configured for one or both of controlling and adjusting power related operations in one or both of said electronic device and said MoCA network.

2. The system of claim 1, wherein said one or more power circuits comprise a power regulator circuit that is operable to draw power from said coax cabling in said MoCA network.

3. The system of claim 2, wherein said power regulator circuit is operable to regulate use of said drawn power at least within said electronic device.

4. The system of claim 1, wherein said one or more power circuits comprise a power source circuit that is operable to supply power into said coax cabling in said MoCA network.

5. The system of claim 4, wherein said power source circuit is operable to supply power into said coax cabling in said MoCA network by applying directed current (DC) voltage.

6. The system of claim 4, wherein said power source circuit is operable to supply power into said coax cabling in said MoCA network by applying low frequency alternating current (AC) voltage.

7. The system of claim 1, wherein said electronic device comprises a switch circuit for selectively turning on or off supplying of power by said electronic device into said coax cabling in said MoCA network.

8. The system of claim 1, wherein said power management circuit is operable to monitor one or both of power supply and power consumption in one or both of said electronic device and said MoCA network.

9. The system of claim 1, wherein said communication circuit is operable to handle communication of said one or more as MoCA based signals over said coax cabling in said MoCA network.

10. The system of claim 1, wherein said one or more control signals comprise at least one control signal for controlling turning on or off supply of power by said electronic device or another electronic device in said MoCA network.

11. The system of claim 1, wherein said one or more control signals comprise at least one control signal for adjusting amount of power supplied or drawn by said electronic device or another electronic device in said MoCA network.

12. The system of claim 1, wherein said electronic device comprises one or more other circuits for handling one or more additional functions.

13. The system of claim 12, wherein said one or more other circuits comprise a wireless circuit operable to handle wireless based communications within said MoCA network.

14. The system of claim 12, wherein said one or more other circuits comprise a receiver circuit operable to provide one or both of interfacing and related processing in support of one or both of set-top box (STB) based functions and operations within the MoCA network.

15. The system of claim 12, wherein said one or more other circuits comprise a cable circuit operable to handle one or both of cable based interfacing and communications with one or more remote cable related nodes.

16. The system of claim 15, wherein said one or more remote cable related nodes are connected to a cable modem termination system (CMTS) in a cable network.

17. The system of claim 1, wherein said electronic device comprises one or more circuits for connecting said electronic device to one or more remote electronic devices external to said MoCA network, via coax cabling external to said MoCA network.

18. The system of claim 17, wherein said one or more power circuits are operable to support one or both of supplying and drawing power over said external coax cabling, to enable one or both of supplying and obtaining power from said one or more remote electronic devices.

* * * * *